(12) United States Patent
Lundberg et al.

(10) Patent No.: US 11,514,582 B2
(45) Date of Patent: Nov. 29, 2022

(54) METHOD AND DEVICE FOR IMAGE ANALYSIS

(71) Applicant: Axis AB, Lund (SE)

(72) Inventors: Stefan Lundberg, Lund (SE); Song Yuan, Lund (SE)

(73) Assignee: AXIS AB, Lund (SE)

(*) Notice: Subject to any disclaimer, the term of this patent is extended or adjusted under 35 U.S.C. 154(b) by 129 days.

(21) Appl. No.: 17/026,321

(22) Filed: Sep. 21, 2020

(65) Prior Publication Data
US 2021/0097695 A1    Apr. 1, 2021

(30) Foreign Application Priority Data

Oct. 1, 2019 (EP) .................................. 19200756

(51) Int. Cl.
| G06K 9/00 | (2022.01) |
| G06T 7/20 | (2017.01) |
| G06T 7/194 | (2017.01) |
| G06T 7/70 | (2017.01) |
| G06T 5/20 | (2006.01) |

(52) U.S. Cl.
CPC ............... *G06T 7/20* (2013.01); *G06T 5/20* (2013.01); *G06T 7/194* (2017.01); *G06T 7/70* (2017.01); *G06T 2207/10016* (2013.01)

(58) Field of Classification Search
None
See application file for complete search history.

(56) References Cited

U.S. PATENT DOCUMENTS

| 2005/0152579 A1 | 7/2005 | Park et al. | |
| 2008/0240500 A1* | 10/2008 | Huang | G06V 10/28 382/103 |
| 2010/0150471 A1* | 6/2010 | Cobb | G06V 10/60 382/274 |

(Continued)

FOREIGN PATENT DOCUMENTS

WO    2019/76187 A1    4/2019

OTHER PUBLICATIONS

Bouwmans, T., "Traditional and recent approaches in background modeling for foreground detection: An overview," Computer Science Review, vol. 11-12, May 17, 2014, pp. 31-66.

(Continued)

*Primary Examiner* — Randolph I Chu
(74) *Attorney, Agent, or Firm* — Xsensus LLP

(57) ABSTRACT

A method includes defining a background model of the video sequence by applying a first algorithm, the background model defining whether that spatial area belongs to a background or a foreground in the video sequence, wherein a detected significant change in image data in a spatial area in an image frame relative image data in said spatial area in a preceding image frame is indicative of said spatial area belonging to the foreground; indicating that an idle area of the defined foreground areas is to be transitioned from foreground to background; and determining whether the idle area is to be transitioned by applying a second algorithm to image data of an image frame of the video sequence, the image data at least partly corresponding to the idle area; wherein if the idle area is not to be transitioned, maintaining the idle area as a foreground area in the background model.

17 Claims, 4 Drawing Sheets

(56) References Cited

U.S. PATENT DOCUMENTS

| | | | | |
|---|---|---|---|---|
| 2014/0254863 | A1* | 9/2014 | Marks | G06T 7/277 |
| | | | | 382/103 |
| 2016/0125621 | A1* | 5/2016 | Saitwal | G06T 7/215 |
| | | | | 382/165 |
| 2016/0269714 | A1* | 9/2016 | Rhemann | G06V 40/172 |
| 2017/0213100 | A1* | 7/2017 | Yun | G06T 7/11 |
| 2018/0286075 | A1* | 10/2018 | Jones | G06F 3/041 |
| 2019/0012793 | A1 | 1/2019 | Ito | |
| 2022/0094953 | A1* | 3/2022 | Bruls | H04N 19/46 |

OTHER PUBLICATIONS

Zang, Y., et al., "An Adaptive Mixture Gaussian Background Model with Online Background Reconstruction and Adjustable Foreground Mergence Time for Motion Segmentation," 2005 IEEE International Conference on Industrial Technology, Dec. 14, 2005, pp. 23-27.

* cited by examiner

METHOD AND DEVICE FOR IMAGE ANALYSIS

CROSS-REFERENCE TO RELATED APPLICATION

The present application claims priority to EP 19200756.5, filed Oct. 1, 2019, the entire contents of which are incorporated herein by reference.

TECHNICAL FIELD

The present invention relates to video processing. More particularly, the present invention relates to a method for image analysis and a video camera comprising a control unit configured to perform a method for image analysis.

BACKGROUND

Video processing is common today, however many implementations require or benefit from pre-processing steps. One common such step is defining and applying a background model to a video sequence. The background model defines which parts of image frames of the video sequence that change between image frames. Based on the definition, the image frame may be divided into an idle background and a changing foreground. The result of the background model allows the video processing to focus on the parts of the image frames that are relevant, e.g. only parts in the changing foreground.

For example, video monitoring is becoming increasingly more common, however it is becoming increasingly important to provide the possibility to mask people and other sensitive objects to protect people's privacy when being recorded. It is known to mask people and other sensitive objects in real-time using non-complex algorithms to analyze foreground/background parts in image frames and their changes. The algorithms may be quick and require low amounts of processing, but may be considered simplistic and not very precise.

In known privacy masking methods, moving objects are typically detected as foreground and are therefore masked. The background is not processed with privacy masks. However, a problem occurs when an object is still for a long time. The object will first be part of the foreground, and thus masked, however, after a while the non-moving object will be considered as background and thus become unmasked, even though the object is still present and should still be masked.

There is thus a need for improvements in this context.

SUMMARY OF THE INVENTION

In view of the above, it is an object of the present inventive concept to eliminate, or at least mitigate one or more of the above-identified deficiencies or problems in the art, such as the problem of foreground objects becoming part of the background. In particular, it is an object of the present disclosure to provide a method for image analysis that differentiates between a background object and a foreground object being idle. Further and/or alternative objects of the present inventive concept will be clear for a reader of this disclosure.

According to a first aspect of the invention, there is provided a method for image analysis of image frames in a video sequence. The method comprises: defining a background model of the video sequence by applying a first algorithm to a plurality of the image frames, the background model defining, for each spatial area of a plurality of spatial areas in the video sequence, whether that spatial area belongs to a background or a foreground in the video sequence, wherein a detected significant change in image data in a spatial area in an image frame relative image data in said spatial area in a preceding image frame is indicative of said spatial area belonging to the foreground; indicating that an idle area of the defined foreground areas is to be transitioned from the foreground to the background; and determining whether the idle area is to be transitioned or not by applying a second algorithm to image data of an image frame of the video sequence, the image data at least partly corresponding to the idle area; wherein upon determining that the idle area is not to be transitioned, maintaining the idle area as a foreground area in the background model.

The inventors have realized that a correctly defined foreground may save considerable time and computational power as it allows for the application of relatively computationally demanding video processing methods by relatively modest hardware. This is because the areas of the image frames that are processed by the demanding video processing methods may be reduced to only the foreground or the background. For many applications, only one of the foreground or the background is relevant, hence the other may be safely ignored by the video processing method if the background model is reliable.

The wording of 'background model' should, within the context of this application, be construed as a data model that determines, for each spatial area of a plurality of spatial areas in the video sequence, whether that spatial area belongs to a background or a foreground in the video sequence. The data model may further store this information or process it in any number of ways.

The wording of 'background' should, within the context of this application, be construed to include any area of an image frame which image data is sufficiently similar to a corresponding area in a previous image frame. Typically, the background is intended to correspond to areas in a monitored scene which are not particularly relevant from an image analysis perspective in the context of monitoring. In a practical and simplified context, the background should correspond to a monitored scenery.

The wording of 'foreground' should, within the context of this application, be construed to include any area of an image frame which image data is sufficiently dissimilar to a corresponding area in a previous image frame. Foreground objects are typically in motion or has a history of motion over the monitoring duration. In a practical and simplified context, the foreground should correspond to monitored objects, such as people, cars, goods, etc.

The wording of 'spatial area' should, within the context of this application, be construed as any number of pixels or subpixels in an image frame that may further be grouped according to e.g. a shape or belonging to a single object. Note that shapes do not need to have sharp edges, a shape may have soft edges or so-called see-through edges based on an alpha mask where the edges gradually fade from full visibility to low visibility over a few pixels in order to avoid sharp looking artefacts around objects.

The wording of 'algorithm' should, within the context of this application, be construed as a method or circuit specifically adapted to predictably perform data analysis.

In some embodiments, the second algorithm is only applied to image data of an image frame after the indication that an idle area is to be transitioned from foreground to background.

Applying the second algorithm under the provision that the indication is present is beneficial in that the second algorithm is only applied when needed. If the second algorithm e.g. is more computationally demanding and/or less reliable compared to the first algorithm, it is beneficial to primarily rely on the first algorithm.

In some embodiments, the transitioning of a spatial area from foreground to background in the background model is only performed after the second algorithm has determined that the idle area of the image frame is to be transitioned.

Performing the transitioning under the provision that the second algorithm has determined that the idle area is to be transitioned is beneficial in that objects are not moved to the background unless verified by the second algorithm, which reduces the impact of false positives from the first algorithm. This allows for a simplistic first algorithm (which may be designed to be performed in real time on modest hardware) since the second algorithm is verifying if the transitioning of an idle area from the background to the foreground is to be performed or not.

In some embodiments, the first algorithm comprises a plurality of timers, each timer associated with a spatial area of the plurality of spatial areas; wherein if no significant change has occurred in image data of a spatial area of an image frame relative image data of said spatial area of a preceding image frame before a predetermined time limit, defining said spatial area as an idle area in the background model.

The timers are beneficial in that they are simple and computationally efficient. It is easy to implement thresholds and/or to manipulate the result compared to similar algorithms.

In some embodiments, wherein upon determining, by the second algorithm, that the idle area is not to be transitioned, the timer associated with that idle area is reset or paused, or the time limit of the timer associated with that idle area is increased.

Manipulating the timers as a response to the determination step is beneficial in that it is a simple and efficient way to maintain the idle area as a foreground area in the background model. It also allows for special treatment of spatial areas that have previously been determined, by the second algorithm, to not be transitioned, by e.g. resetting the timer to a different number than what it started as. This is beneficial e.g. if a specific spatial area is more prone to being idle, such as corresponding to a seat or bed where foreground people may rest, so that a longer timer may reduce false positives.

In some embodiments, the step of indicating that an idle area is to be transitioned from foreground to background is performed when a timer of the first algorithm associated with the idle area reaches an indication threshold being lower than the predetermined time limit.

The indication threshold is beneficial in that the second algorithm may take some amount of time, so by using an indication threshold the determination step may be completed before the timer of the first algorithm reaches the predetermined time limit.

In some embodiments, upon determining a significant change in image data in the idle area in an image frame relative image data in said idle area in a preceding image frame during the step of applying the second algorithm, the step of applying the second algorithm is aborted and the idle area is maintained as a foreground area in the background model.

Aborting the step of applying the second algorithm is beneficial in that time and computational power may be saved.

In some embodiments, the second algorithm is more computationally demanding than the first algorithm.

The second algorithm being more computationally demanding is beneficial in that it is used less often than the first algorithm, thus considerable computational power may be saved. More computationally demanding algorithms may further be specifically adapted to reduce false positives from the less complex first algorithm, hence being more suitable for a second level of implementation, i.e. being applied after a first algorithm.

In some embodiments, the second algorithm is applied at a later time when more computational resources are available.

The second algorithm being applied at a later time when more computational resources are available is beneficial in that this check may be scheduled for completion later, and allows the second algorithm to be applied using lower grade hardware. For example, the second algorithm may be applied when available computational resources in a device implementing the method is more than a threshold percentage of the total computational resources, or when the available computational resources exceed a threshold amount.

In some embodiments, the step of applying the second algorithm comprises applying an image segmentation algorithm for locating an object in the image data, said object at least partly extending into the idle area, wherein image data corresponding to the located object defines the image data that the second algorithm is applied to.

The image segmentation algorithm is beneficial in that it may increase the reliability of the second algorithm and more correctly determine the foreground.

In some embodiments, the second algorithm is adapted to perform least one of the following: face recognition, head detection, body detection, vehicle detection, license plate detection, motion analysis, object tracking, and detection of other pre-registered important objects.

These types of image analysis are beneficial in that they are commonly used and they all benefit in some way from being in a second level of implementation. In some embodiments, the image analysis is adapted to identify object parts forming a person identifier, i.e. that may be used for identifying a person. Non-limiting examples of person identifiers are faces, eyes, finger prints, staff uniforms, id cards, and payment cards.

In some embodiments, the method further comprises masking spatial areas that are part of the foreground.

Masking is beneficial in that it allows for privacy and/or reduction of shown information for simplified further analysis. Masking may also add general graphics or information showing e.g. object type, to ease scene understanding without disclosing the identity of the object. Different object types may have masks with different icons and/or colors.

In some embodiments, the method further comprises tracking an object depicted in the video sequence by tracking corresponding image data in spatial areas that are part of the foreground in the video sequence.

Tracking is beneficial in that object tracking is simplified when the foreground is correctly distinguished. The object tracking may further be used to improve the second algorithm to ensure that the foreground is correct.

According to a second aspect of the invention, there is provided a non-transitory computer-readable recording medium having recorded thereon a program for implementing the method according to the first aspect when executed on a device having processing capabilities.

According to a third aspect of the invention, there is provided a video camera capturing image frames in a video sequence. The video camera comprises a control unit configured to: define a background model of the video sequence by applying a first algorithm to a plurality of the image frames, the background model defining, for each spatial area of a plurality of spatial areas in the image frames, whether that spatial area belongs to a background or a foreground in the video sequence, wherein a detected significant change in image data in a spatial area in an image frame relative image data in said spatial area in a preceding image frame is indicative of said spatial area belonging to the foreground; indicate that an idle area of the defined foreground areas is to be transitioned from the foreground to the background; and determine whether the idle area is to be transitioned or not by applying a second algorithm to image data of an image frame of the video sequence, the image data at least partly corresponding to the idle area; wherein upon determining that the idle area is not to be transitioned, maintain the idle area as a foreground area in the background model.

In some embodiments, the control unit is further configured to apply the first and second algorithm to a plurality of the image frames in the video sequence in real time.

The real time application of the algorithms is beneficial in that it allows for real time privacy masking and/or object tracking. The algorithms are applied in such a way that the total image analysis is very efficient and may therefore be applied in real time by most video cameras without any changes and/or compromises.

The above mentioned features of the first aspect, when applicable, apply to this third aspect as well and vice versa. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
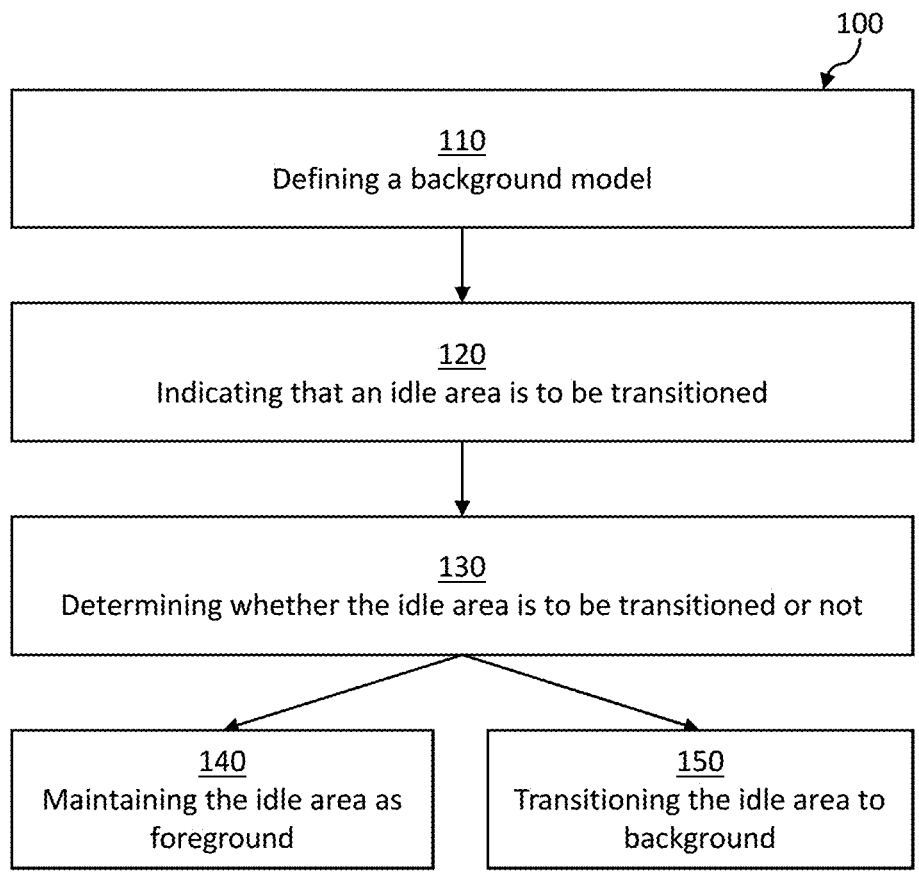
FIG. 1 is a block scheme of a method for image analysis of image frames in a video sequence.

The method 100 of FIG. 1 will now be described in conjunction with FIGS. 3-4. FIG. 1 is a block scheme of a method 100 for image analysis of image frames 30a-c in a video sequence. The image frames 30a-c of FIGS. 4a-b show a time lapse from left to right. The method 100 comprises a number of steps that may be performed in a specific order, e.g. the one shown in FIG. 1 or any other suitable order. In the examples below, it is assumed that image frame 30c is the currently processed/analyzed image frame unless anything else is specified.

The defining step 110 comprises defining a background model of the video sequence. The background model defines, for each spatial area 10 of a plurality of spatial areas 10 in the image frames 30a-c, whether that spatial area 10 belongs to a background 22 or a foreground 24 in the video sequence. A detected significant change in image data in a spatial area 10 in a currently processed image frame 30c relative image data in said spatial area 10 in a preceding image frame 30a-b is indicative of said spatial area 10 belonging to the foreground 24.

The background model is a tool for different video processing means to differentiate between spatial areas 10 that do not significantly change during a time period, thereby belonging to the background 22, and spatial areas 10 that significantly change during a time period, thereby belonging to the foreground 24.

In its simplest form, a background model may comprise a pixel value for each pixel position in spatial areas 10 of an image frame 30a-c. If a pixel value at a corresponding position in the current image frame 30c (i.e. the image frame 30c being currently analyzed) differs by more than a threshold value (i.e. significantly differs) from a pixel value at a corresponding position in a previous image frame 30a-b (i.e.

an image frame 30a-b preceding the current image frame 30c), the pixel position in the current image frame 30c is to be considered as belonging to the foreground 24. Otherwise, it is to be considered as a belonging to the background 22. The background model is then updated based on pixel values in the current image frame 30c.

It should be noted that a spatial area 10 may comprise several pixels. For example, if noise in one pixel is too large, then a number of pixels are compared together since the average over many pixels will have lower noise. This avoids a situation where evenly spread noise from image sensors causes everything in the frame to transition to the foreground. The number of pixels grouped together may differ depending e.g. on light level or due to different noise levels.

In embodiments where spatial areas 10 may comprise several pixels, they may comprise pixels that belong to the background 22 and pixels that belong to the foreground 24. In such a case, one of the two groups, i.e. the background 22 or the foreground 24, may be used as a default if a spatial area 10 comprises pixels belonging to both groups. In another embodiment, the most prevalent of the two groups may determine whether the spatial area 10 belongs to the background 22 or the foreground 24. In a further embodiment, a spatial area 10 comprising pixels belonging to both groups is divided into several spatial areas 10 that each only comprises pixels belonging to one group.

In another embodiment, the background model comprises a plurality of pixel values per pixel position, e.g. defining the pixel values of the last X number of image frames 30a-c at the pixel position. If the pixel value at the pixel position of the current image frame 30 significantly differs from the pixel values of the corresponding pixel position in the background model (represented by a representative pixel value being e.g. based on a variance of the pixel values, a threshold, or any other statistical measure), the pixel position in the current image frame 30c is considered as belonging to the foreground 22, and belonging to the background 24 otherwise. The background model is then updated based on pixel values in the current image frame. It should be noted that there are many different ways of implementing a background model than the ones exemplified herein.

If the video sequence is captured by e.g. a fixed monitoring camera, the background 22 of the image frames 30a-c of the video sequence corresponds to the static background of the scene being monitored. The monitoring may only be interested in the background 22 or the foreground 24 depending e.g. whether people or stock is being monitored.

The foreground 24 may comprise static areas in some embodiments. For example, if the scene being monitored comprises a parking lot, the asphalt and walls may be defined as the background 22 and the parked, idle cars may be defined as the foreground 24. To achieve this, a second algorithm specifically adapted to prevent idle cars from being transitioned to background 22 may be used as described herein. Examples of such second algorithms comprise license plate detection and/or image segmentation.

Hence, the background model may be used to filter out irrelevant information and to improve any video processing that may be performed on the video sequence.

The indicating step 120 comprises receiving an indication that an idle area 12 of the defined foreground 24 is to be transitioned 150 from the foreground 24 to the background 22.

The indication may be provided in the defining step 110, e.g. after finding an idle area 12. A spatial area 10 may be defined as an idle area 12 based on whatever condition is used in the defining step 110 to differentiate between the background 22 and the foreground 24. For example, a spatial area 10 may be identified as being idle 12 e.g. if no significant change is detected in image data in the spatial area 10 of the current image frame 30c relative image data in the spatial area 10 in a preceding image frame 30a-b.

Indicating may comprise labelling a spatial area 10 as an idle area 12 using e.g. metadata or a separate lookup table.

The indication may be communicated by a unit/process/algorithm analyzing the background model and providing the indications when necessary. In other embodiments, the background model in itself comprises means for providing the indication.

By only indicating 120 idle areas 12 among the spatial areas 10 of the defined foreground areas 24, computational power may be saved. This is because spatial areas 10 belonging to the background 22 are assumed to be idle and are already part of the background 22.

The determining step 130 comprises determining whether the idle area 12 is to be transitioned 150 or not.

The determining step 130 may comprise analyzing any image frame 30a-c of the video sequence, not just the ones where the spatial area 10 corresponds to an idle area 12. This is beneficial in that the most informative image frame 30a-c is not necessarily the most recent one or the one most similar to the currently analyzed one 30c. As an example, it may be easier to find a foreground object that has been in motion and which is presently idle by analyzing image frames 30a-c where the spatial area 10 does not correspond to an idle area 12.

A maintaining step 140 comprises maintaining the idle area 12 as a foreground area 24 in the background model. The maintaining step 140 preferably occurs upon determining 130 that the idle area 12 is not to be transitioned 150.

The step of maintaining 140 may be achieved by not doing anything or by communicating with the circuitry comprising the background model or any other suitable processing means to prevent a transition 150 that may already have been initiated.

The step of maintaining 140 may further comprise manipulating the defining step 110 to ensure that the maintained idle area 12 remains in the foreground 24.

A transitioning step 150 comprises transitioning the idle area 12 to the background 22 in the background model, i.e. after determining 130 that the idle area 12 is to be transitioned 150.

The transitioning step 150 may comprise labelling the idle area 12 as background 22 using e.g. metadata or a separate lookup table. The circuitry applying the transition may communicate with the circuitry comprising the background model and/or a separate processor e.g. performing another step of the method 100 or capturing the video sequence. In one embodiment, the circuitry comprising the background model is the same circuitry that applies the transition, whereby no communication is necessary.

The transitioning step 150 may further be influenced by a communication from the background model and/or a separate processor e.g. performing another step of the method 100 or capturing the video sequence.

In a preferred embodiment, only one of the maintaining step 140 and the transitioning step 150 is performed.

Figure 2:
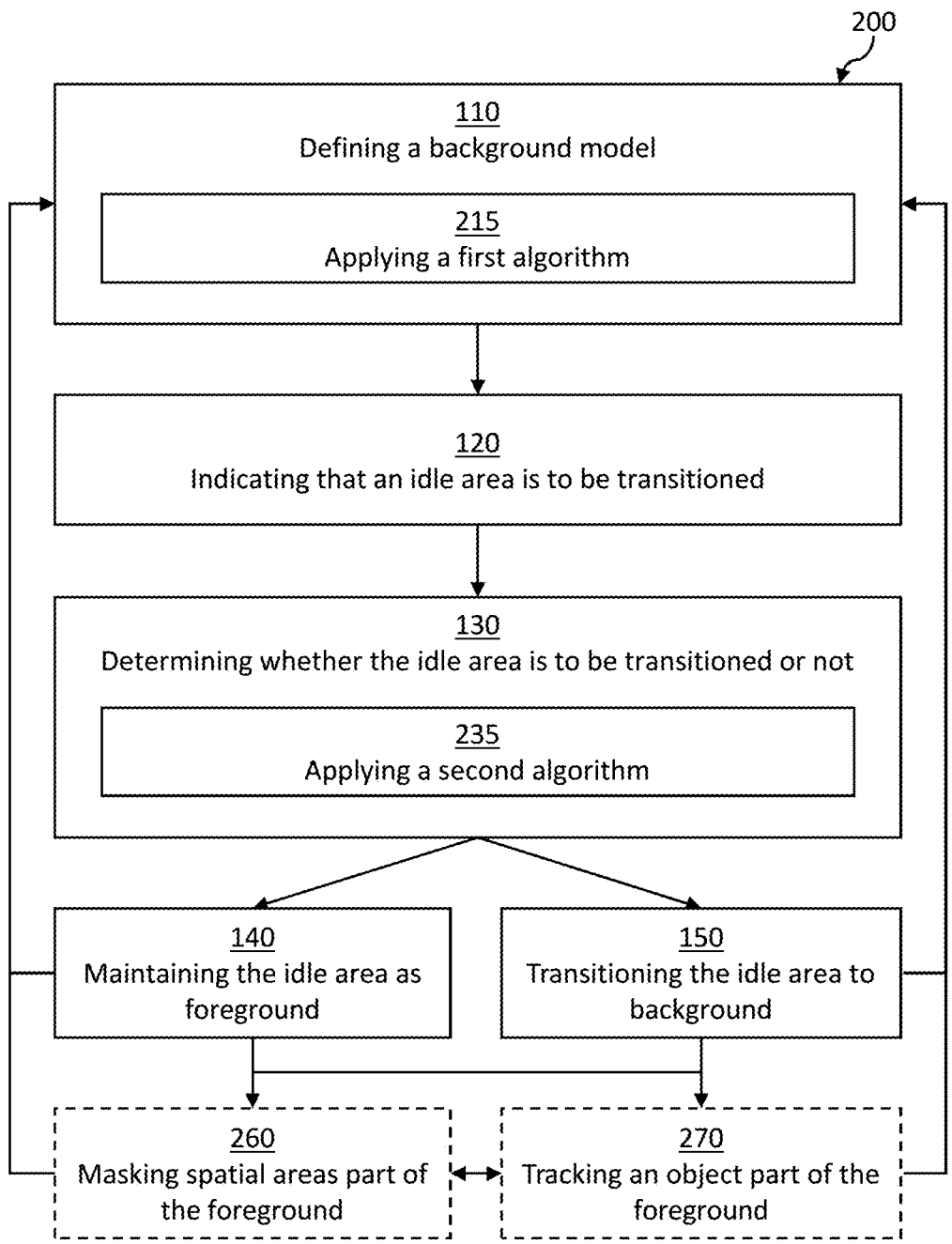
FIG. 2 is a block scheme of a method for image analysis of image frames in a video sequence further comprising a first and second algorithm, masking and/or tracking parts of the foreground and loops.

FIG. 2 is a block scheme of a method 200 for image analysis of image frames 30a-c in a video sequence further comprising applying 215, 235 a first and second algorithm, masking 260 and/or tracking 270 parts of the foreground 24 and loops. The method 200 of FIG. 2 will now be described in conjunction with FIGS. 3-4.

The defining step 110 comprises applying 215 a first algorithm to a plurality of the image frames 30a-c. The first algorithm is used to determine whether the spatial areas 10 of each image frame 30a-c belong to the background 22 or the foreground 24 in the background model. The first algorithm may further detect when a spatial area 10 becomes an idle area 12.

The first algorithm may be configured to detect a significant change in image data in a spatial area 10 in the currently analyzed image frame 30c relative image data in the spatial area 10 in a preceding image frame 30a-b, e.g. to define if any spatial area 10 belonging to the background 24 is to be transitioned to the foreground 22.

The first algorithm may additionally be configured to specifically detect no significant change has occurred in image data in a spatial area 10 in the current image frame 30c relative image data in the spatial area 10 in a preceding image frame 30a-b, e.g. to define if any spatial area 10 belonging to the foreground 22 is to be transitioned to the background 24.

The first algorithm may e.g. comprise analyzing image data in a spatial area 10 in the current image frame 30c and comparing it to a corresponding spatial area 10 in one or more previous image frames 30a-b. If said image data significantly differs between the spatial areas 10, the spatial area 10 is considered to belong to the foreground 24 according to the first algorithm.

The determining step 130 comprises applying 235 a second algorithm to image data of an image frame 30a-c of the video sequence, the image data at least partly corresponding to the idle area 12.

The second algorithm may be configured to determine whether an idle area 12 (as indicated in the indication step 120) is to be transitioned 150 or not.

The second algorithm may be applied to any one or several of the image frames 30a-c of the video sequence, not just the ones with idle areas 12.

The image data corresponding to the idle areas 12 may be comprised in a different spatial area 10 in a previous image frame 30a-b, e.g. if the foreground 24 object has moved. Hence, the second algorithm may be applied to image data of different spatial areas 10 in different image frames 30a-c.

The second algorithm may be adapted to be applied 235 to image data of an image frame 30a-c under the provision that the indication is present that an idle area 12 is to be transitioned from the foreground 24 to the background 22.

Only applying 235 the second algorithm after the indication step 120 is beneficial in that the second algorithm is only used when needed. If the second algorithm e.g. is more computationally demanding and/or less reliable compared to the first algorithm, it is beneficial to primarily rely on the first algorithm.

The method 200 further allows for a second algorithm to be used that is relatively more time consuming than the first algorithm such that it would not be efficient or justifiable to apply 235 the second algorithm as often as the first algorithm.

The second algorithm may be applied 235 at a later time when enough computational resources are available.

Since it is about a potential transition of an object from foreground 24 to background 22 due to low activity, this check may be scheduled for completion later. The second algorithm does not need to complete immediately, the second algorithm may e.g. keep track of all areas marked for potential transitions to be checked and areas marked for ongoing check. The second algorithm may then be applied when enough (e.g. over a threshold) computational resources are available.

The transitioning 150 of a spatial area 10 from the foreground 24 to the background 22 in the background model may be performed under the provision that the second algorithm has determined 130 that the idle area 12 of the image frame 30c is to be transitioned 150.

Only performing the transitioning 150 after the determination step 130 is beneficial in that objects are not moved to the background 22 unless verified by the second algorithm, which reduces the impact of false positives from the first algorithm.

In embodiments where the determining step 130 comprises applying 235 a second algorithm at a later time, either due to scheduling to conserve computational power or due to the second algorithm taking a long time due to its complexity, the transition step 150 is only performed after the second algorithm is applied 235.

Figure 3A:
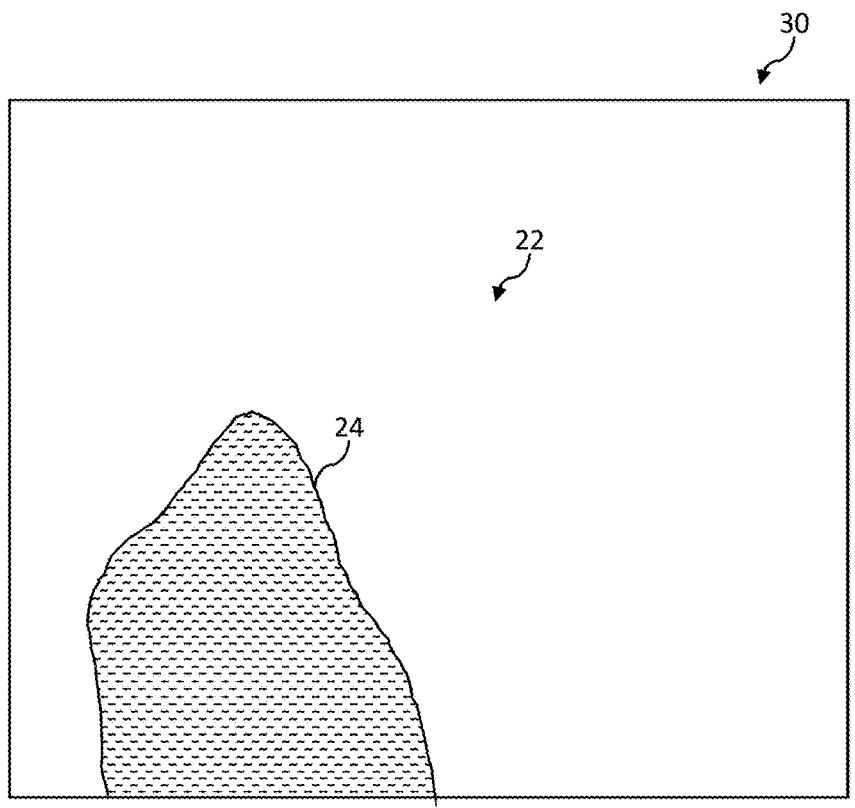
FIG. 3a is a schematic illustration of an image frame in a video sequence that has a background model defining whether spatial areas in the image frame belong to a background or a foreground.

False positives may be detrimental e.g. in embodiments with privacy masking 260 as discussed with regards to FIG. 3a.

As an alternative, if it is determined 130, by use of the second algorithm, that the idle area 12 of the image frame 30c is not to be transitioned 150, the determination step 130 may cause the transitioning 150 to be reversed if it has already been performed or initiated.

The second algorithm may be more computationally demanding than the first algorithm.

The second algorithm being more computationally demanding is beneficial in that it is used less often than the first algorithm, thus considerable computational power may be saved.

The second algorithm may further generate less false negative results than the first algorithm, hence being suitable verifying the results of the first algorithm.

The step of applying 235 the second algorithm may comprise applying an image segmentation algorithm for locating an object in the image data, said object at least partly extending into the idle area 12, wherein image data corresponding to the located object defines the image data that the second algorithm is applied 235 to.

The image segmentation algorithm is beneficial in that it may increase the reliability of the second algorithm and more correctly determine the foreground 24.

Image segmentation comprises locating objects and boundaries in image data of one or more image frames 30a-c.

If a foreground object e.g. comprises a large, mono colored square, the square may be placed such that image data of a spatial area 10 does not significantly change (e.g. less than a threshold number of pixels in the image data is significantly changing, or a summarized difference between the pixels of the image data of the spatial area 10 and the background model is below a threshold difference, etc.) even though the object and the square moves. Therefore, the image segmentation may locate the full object to find that even though said spatial area 10 is idle, the object is not idle. By being applied to the full object, the second algorithm may more easily determine 130 that the idle area 12 should be maintained 140 as it is part of a foreground object.

The second algorithm may be adapted to perform at least one of the following: face recognition, head detection, body detection, vehicle detection, license plate detection, motion analysis, object tracking 270, and detection of other pre-registered important objects.

The second algorithm may be adapted to perform face recognition. Face recognition is used to find whether spatial areas 10 of the foreground 24 comprise a face. If they do, they are assumed to be alive and therefore part of the foreground 24. Any idle areas 12 that comprise a face are thereby determined 130 to be maintained 140 as foreground 24.

Face recognition is preferably combined with image segmentation and/or body detection in order to find the person or animal that the face belongs to such that the whole image area of the person or animal is determined to be maintained 140 as foreground 24.

The second algorithm may be adapted to perform head or body detection. Head or body detection is used to find whether spatial areas 10 of the foreground 24 comprise a human or animal head or body. If they do, they are assumed to be alive and therefore part of the foreground 24. Any idle areas 12 that comprise a head or body are thereby determined 130 to be maintained 140 as foreground 24.

Head or body detection may be combined with each other and/or face recognition to improve the accuracy of the head or body detection.

The second algorithm may be adapted to perform vehicle or license plate detection. Vehicle or license plate detection is used to find whether spatial areas 10 of the foreground 24 comprise a vehicle or license plate. If they do, they are assumed to be a vehicle and therefore part of the foreground 24. Any idle areas 12 that comprise a vehicle or license plate are thereby determined 130 to be maintained 140 as foreground 24.

The second algorithm may be adapted to perform motion analysis. Motion analysis is used to find whether spatial areas 10 of the foreground 24 comprise any moving objects. If they do, they are assumed to be part of the foreground 24. Any idle areas 12 that comprise motion are thereby determined 130 to be maintained 140 as foreground 24.

Motion analysis is preferably used in conjunction with image segmentation in order to find other spatial areas 10 that comprise the same object that may be in motion even when one spatial area 10 is idle. This may be implemented by the second algorithm checking the result of the first algorithm, being related to motion detection, in spatial areas 10 that comprise the same object. In this embodiment, the second algorithm is adapted to perform motion analysis by implementing the motion detection of the first algorithm.

Thus, motion analysis may be implemented as the second algorithm consisting only of image segmentation and instructions to check the results of the first algorithm.

Motion analysis may further be more complex, e.g. used in conjunction with image segmentation and/or object tracking 270 to find if the same idle object was in motion in a previous image frame 30 of the video sequence. This may again make use of the result of the first algorithm and/or analyze several image frames 30 to find motion in some other way.

The second algorithm may be adapted to perform object tracking 270. Object tracking 270 is used to detect and follow objects being monitored. This may be used to find where objects in idle areas 12 of the foreground 24 have previously been. If an object has been determined to be maintained 140 as foreground 24 when it was in a different spatial area 10, it may be beneficial to once again maintain 140 it as foreground 24 and vice versa.

Object tracking 270 may result in a different determination 130 than motion analysis if e.g. the area being monitored comprises a train track or a conveyor belt. The object tracking 270 may comprise determining if the tracked object has a regularity or similarity with previously tracked objects.

The second algorithm may be adapted to determine 130 that regularly passing trains and continually moving conveyor belts are part of the background 22 and/or that a cat it has seen before is part of the foreground 24.

After the maintaining step 140 and/or the transitioning step 150 is performed, the method 200 may loop back to the beginning of the method 200.

By continually looping the method 200 for image analysis of image frames 30a-c in a video sequence, new image frames 30 may be analyzed and/or compared to previously analyzed image frames 30 to e.g. continue to update the background model and/or learn from a previous analysis.

260 270 The masking step 260 comprises masking spatial areas 10 that are part of the foreground 24.

Masking 260 is beneficial in that it allows for privacy and/or reduction of shown information for simplified further analysis. The masking 260 may comprise blurring out and/or replacing spatial areas 10 of the image frame 30 to be non-descript or mono colored.

Masking 260 may comprise privacy masking, e.g. masking faces and/or license plates using face recognition and/or license plate detection. This may further comprise masking 260 the entire person and/or car that the face and/or license plate belongs to. This may be achieved using e.g. image segmentation and/or object tracking.

Privacy masking is beneficial in that it allows people to be monitored for safety and/or security reasons without compromising their privacy.

The foreground 24 may be masked in order to monitor the background 22 without disturbances from the foreground 24 and/or while keeping the privacy of people in the foreground 24.

Parts of the background 22 may further be masked 260 if e.g. non-masked parts of the foreground 24 are more interesting to monitor.

The tracking step 270 comprises tracking an object depicted in the video sequence by tracking corresponding image data in spatial areas 10 that are part of the foreground 24 in the video sequence.

Tracking 270 is beneficial in that object tracking is simplified when the foreground 24 is correctly distinguished. This is because only spatial areas 10 that are part of the foreground 24 may be considered when finding the object e.g. in new image frames 30.

The object tracking 270 may further be used to improve the second algorithm to ensure that the foreground 24 is correct. This is because a tracked object should always be part of the foreground 24 in some embodiments.

A non-transitory computer-readable recording medium may have recorded thereon a program for implementing the method 100, 200 according to any one of the FIGS. 1-2 when executed on a device having processing capabilities.

One such device may be a video camera. A video camera may in itself be configured to perform the method 100, 200 according to any one of the FIGS. 1-2.

A video camera capturing image frames 30a-c in a video sequence may comprise a control unit configured to: define 110 a background model of the video sequence by applying 215 a first algorithm to a plurality of the image frames 30a-c, the background model defining, for each spatial area 10 of a plurality of spatial areas 10 in the image frames 30a-c, whether that spatial area 10 belongs to a background 22 or a foreground 24 in the video sequence, wherein a detected significant change in image data in a spatial area 10 in an image frame 30c relative image data in said spatial area 10 in a preceding image frame 30*a-b* is indicative of said spatial area 10 belonging to the foreground 24; indicate 120 that an idle area 12 of the defined foreground areas 24 is to be transitioned 150 from the foreground 24 to the background 22; and determine 130 whether the idle area 12 is to be transitioned 150 or not 140 by applying 235 a second algorithm to image data of an image frame 30*c* of the video sequence, the image data at least partly corresponding to the idle area 12; wherein upon determining that the idle area (12) is not to be transitioned 150, maintain 140 the idle area 12 as a foreground area 24 in the background model.

The control unit may further be configured to apply 215, 235 the first and second algorithm to a plurality of the image frames 30*a-c* in the video sequence in real time.

The real time application of the algorithms is beneficial in that it allows for real time privacy masking 260 and/or object tracking 270. The algorithms are applied 215, 235 in such a way that the total image analysis is very efficient and may therefore be applied in real time by most video cameras without any changes and/or compromises.

The first algorithm may be relatively efficient and may be applied 215 in real time even on relatively modest hardware. The second algorithm is only applied 235 when needed, hence even if it is relatively computationally demanding, it may be applied in real time.

Real time video processing is highly secure in that e.g. privacy masking 260 is active for as long as the video sequence is accessible, hence no malicious spyware may access a non-privacy masked 260 version of the video sequence.

FIG. 3*a* illustrates an image frame 30 in a video sequence. The video sequence comprises a background model defining whether spatial areas 10 in the image frame 30 belong to a background 22 or a foreground 24.

In this embodiment, any significant change in the background 22 transitions the corresponding spatial area 10 to the foreground 24. Spatial areas 10 comprising image data that are substantially unchanged for a sufficiently prolonged time, i.e. idle areas 12, may be transitioned 150 to the background 22 as shown in FIG. 4*b*. However, first it is determined 130 whether the idle area 12 should be maintained 140.

This extra level of determination 130 before transitioning 150 idle areas 12 to the background 22 may not be present for the corresponding transition from the background 22 to the foreground 24.

This is beneficial e.g. because of privacy concerns. If the foreground 24 is privacy masked 260 and/or object tracked 270, incorrectly moving it to the background 22, e.g. as a result of a false positive result of the first algorithm, even for a short time before the spatial area 10 stops being idle, may be detrimental. For the case of privacy masking 260, the privacy may be lost and for the case of object tracking 270, the object may be lost.

It may further be important to allow for enough leniency, e.g. in the implementation of the determination step 130, to allow for subtle changes in the background 22 without transitioning such spatial areas 10 to the foreground 24 and/or keeping such spatial areas 10 in the foreground 24 instead of transitioning 150 them to the background 22.

For example, natural light will change over time, causing changes to the background 22 without significantly affecting what should be considered background 22. In this case, the spatial areas 10 affected by the change in light should remain in the background 22 or be relatively quickly transitioned 150 to the background 22.

In an alternative embodiment, the background 22 is not checked for any non-idle spatial areas 10 that may be transitioned to the foreground 24, once something is in the background 22 it stays there.

In embodiment with several video sequences, e.g. captured by different video cameras, the method 100, 200 may be applied to the video sequences in tandem. If two or more video sequences comprise image frames 30 with spatial areas 10 that correspond to the same physical location, the method 100, 200 may analyze all these spatial areas 10 and determine 130 whether they should be maintained 140 or transitioned 150 as a group. This allows for e.g. changes in angles to be used for a more reliable determination 130.

Figure 3B:
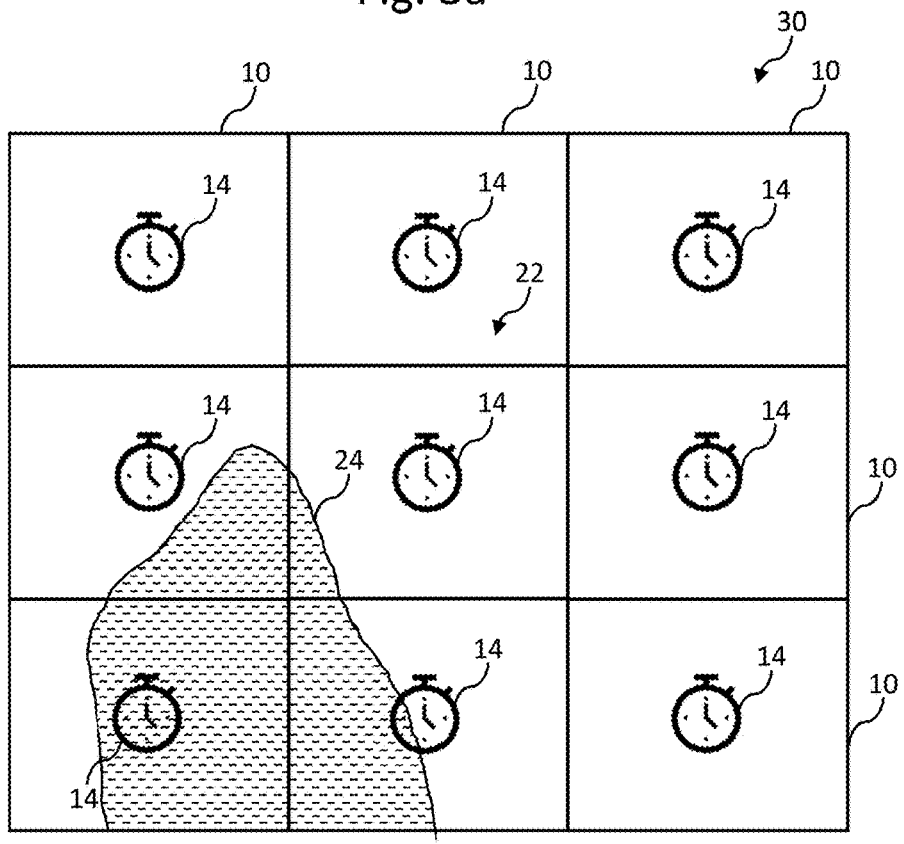
FIG. 3b is a schematic illustration of the image frame of FIG. 3a further having a first algorithm comprising a plurality of timers.

FIG. 3*b* illustrates the image frame 30 of FIG. 3*a* overlapped with a schematic illustration of a first algorithm comprising a plurality of timers 14. Each timer 14 is associated with a spatial area 10 of a plurality of spatial areas 10 in the image frame 30.

If no significant change has occurred in image data of a spatial area 10 of an image frame 30 relative image data of said spatial area 10 of a preceding image frame 30 before a predetermined time limit, said spatial area 10 is defined as an idle area 12 in the background model.

If significant change is detected in image data of a spatial area 10 of an image frame 30 relative image data of said spatial area 10 of a preceding image frame 30, a spatial area 10 of the background 22 may transition to foreground 24.

The timers 14 are beneficial in that they are simple and computationally efficient. It is easy to implement thresholds and/or to manipulate the result compared to similar algorithms.

This is partly because timers 14 are numbers and numbers are simple. For example, by simply adding a number of seconds to a timer 14, the timer 14 will reach its threshold faster without needing to change the threshold. As another example, a timer 14 may be prevented from ever reaching its threshold by resetting it with a predictable periodicity.

The timers 14 may further count up and/or down without significant computational complexity.

Upon determining 130, by the second algorithm, that the idle area 12 is not to be transitioned 150, the timer 14 associated with that idle area 12 may be reset or paused, or the time limit of the timer 14 associated with that idle area 12 may be increased.

Manipulating the timers 14 as a response to the determination step 130 is beneficial in that it is a simple and efficient way to maintain the idle area 12 as a foreground area 24 in the background model. It also allows for special treatment of spatial areas 10 that have previously been determined, by the second algorithm, to not be transitioned 150, by e.g. resetting the timer 14 to a different number than what it started as. This is beneficial e.g. if a specific spatial area 10 is more prone to being idle, such as corresponding to a seat or bed where foreground 24 people may rest, so that a longer timer 14 may reduce false positive results.

An idle area 12 may be indicated 120 to be transitioned 150 from foreground 24 to background 22 when a timer 14 of the first algorithm associated with the idle area 12 reaches an indication threshold being lower than the predetermined time limit.

The indication threshold is beneficial in that applying 235 the second algorithm may take some amount of time, so by using an indication threshold the determination step 130 may be completed before the timer 14 of the first algorithm reaches the predetermined time limit, thereby saving time.

In embodiments where several determination steps 130 occur concurrently for different image frames 30 and/or different spatial areas 10 of the same image frame 30, this may conserve a considerable amount of time depending on how frequently the image frames 30 are analyzed.

Upon determining 130 a significant change in image data in the idle area 12 in an image frame 30 relative image data in said idle area 12 in a preceding image frame 30 during the step of applying 235 the second algorithm, the step of applying 235 the second algorithm may be aborted and the idle area 12 may be maintained 140 as a foreground area 24 in the background model.

Aborting the step of applying 235 the second algorithm is beneficial in that time and computational power may be saved. While the second algorithm is applied 235, the idle area 12 may no longer be considered as idle, which may mean that there is no point of continuing the step of applying 235 the second algorithm.

If the step of applying 235 the second algorithm has been started early, e.g. by a timer 14 of the first algorithm associated with the idle area 12 reaching an indication threshold being lower than the predetermined time limit, it is possible that the idle area 12 does not remain idle until the predetermined time limit is reached. Hence, further synergy may be achieved by allowing the step of applying 235 the second algorithm to be aborted.

Figure 4A:
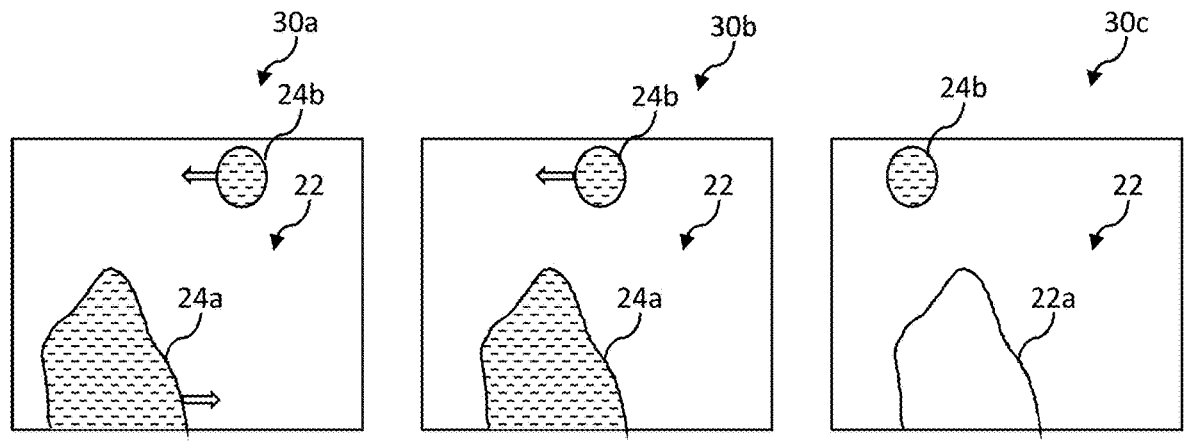
FIG. 4a is a schematic illustration of image frames in a video sequence of a foreground object transitioning to background.

FIG. 4a is a schematic illustration of image frames 30a-c in a video sequence of two foreground objects 24a, 24b transitioning to background 22. The image frames 30a-c show a time lapse from left to right.

In the leftmost image frame 30a, both of the foreground objects 24a, 24b are in motion. In the middle image frame 30b, the lower foreground object 24a is idle while the upper foreground object 24b remains in motion. In the rightmost image frame 30c, the lower object 22a has been transitioned 150 to background 22 after being idle while the upper foreground object 24b remains in motion.

Figure 4B:
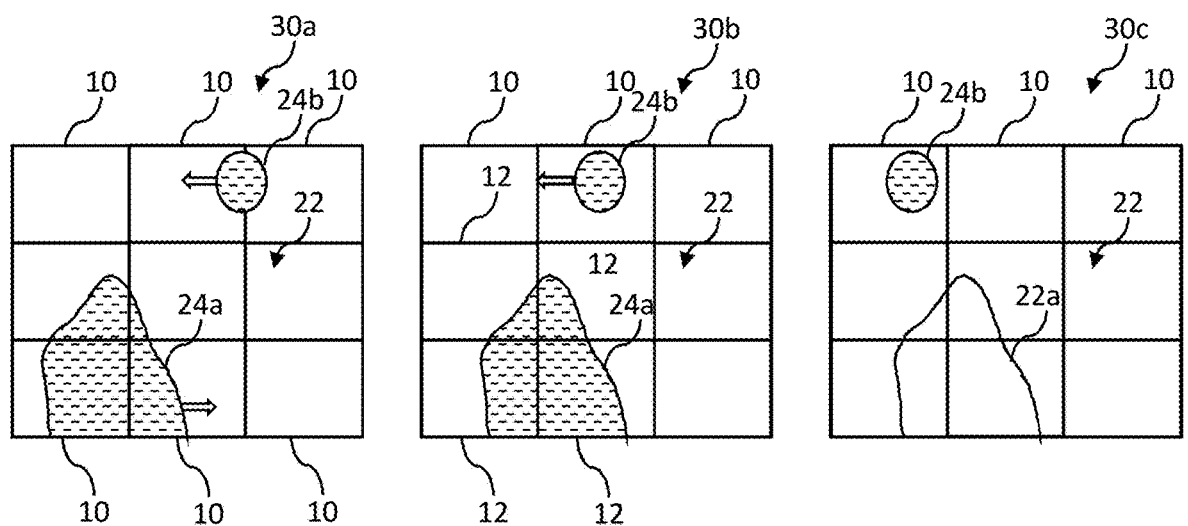
FIG. 4b is a schematic illustration of the image frames of FIG. 4a in which spatial areas become idle areas.

FIG. 4b is a schematic illustration of the image frames 30a-c of FIG. 4a overlapped with a schematic illustration of the spatial areas 10 of the image frames 30a-c becoming idle areas 12.

The lower foreground object 24a becomes idle in the middle image frame 30b. Therefore, the spatial areas 10 comprising the object 24a become idle areas 12, whereas they were not in the leftmost image frame 30a when the object 24a was in motion.

The idle areas 12 of the middle image frame 30b are indicated 120 to be transitioned 150 from the foreground 24 to the background 22. After the second algorithm has determined 130 that the idle areas 12 are to be transitioned 150, they are transitioned 150. In the rightmost image frame 30c, the object 22a has thus been transitioned 150 to background 22.

If the second algorithm would determine 130 that the idle areas 12 are not to be transitioned 150, the object 24a would be maintained 140 in the foreground 24.

The spatial areas 10 are depicted in the figures as being nine areas per image frame 30a-c. There may be substantially more or fewer than depicted. As an example, each pixel or each square of four pixels of the image frame 30a-b may be a spatial area 10. In another embodiment, each macroblock, coding unit or coding tree unit may be considered as a spatial area 10.

The person skilled in the art realizes that the present invention by no means is limited to the preferred embodiments described above. On the contrary, many modifications and variations are possible within the scope of the appended claims.

For example, the indicating step 120 may be skipped and spatial areas 10 may be much smaller compared to the figures. The foreground 24 may be defined using any embodiment of the second algorithm concurrently with the defining step 110. There may be a third level beyond the background 22 and foreground 24 defined by a different embodiment of the second algorithm than the one defining the foreground 24.

Additionally, variations to the disclosed embodiments may be understood and effected by the skilled person in practicing the claimed invention, from a study of the drawings, the disclosure, and the appended claims.

The invention claimed is:

1. A method for image analysis of image frames in a video sequence, the method comprising:
defining a background model of the video sequence by applying a first algorithm, executed on circuitry, to a plurality of the image frames, the background model defining, for each spatial area of a plurality of spatial areas in the image frames, whether that spatial area belongs to a background or a foreground in the video sequence, wherein the first algorithm includes a plurality of timers, each timer associated with a spatial area of the plurality of spatial areas;
indicating that an idle area of the defined foreground areas is to be transitioned from the foreground to the background, wherein a spatial area is defined as an idle area in the background model on condition that no significant change has occurred in image data of a spatial area of an image frame relative to image data of the spatial area of a preceding image frame before a predetermined time limit; and
determining whether the idle area is to be transitioned or not by applying a second algorithm, executed on circuitry, to image data of an image frame of the video sequence, the image data at least partly corresponding to the idle area, wherein upon determining that the idle area is not to be transitioned, maintaining the idle area as a foreground area in the background model.

2. The method according to claim 1, wherein the second algorithm is only applied to image data of an image frame after the indication that an idle area is to be transitioned from foreground to background.

3. The method according to claim 1, wherein the transitioning of a spatial area from foreground to background in the background model is only performed after the second algorithm has determined that the idle area of the image frame is to be transitioned.

4. The method according to claim 1, wherein upon determining, by the second algorithm, that the idle area is not to be transitioned, resetting or pausing the timer associated with that idle area, or increasing the time limit of the timer associated with that idle area.

5. The method according to claim 1, wherein the indicating that an idle area is to be transitioned from foreground to background is performed when a timer of the first algorithm associated with the idle area reaches an indication threshold being lower than the predetermined time limit.

6. The method according to claim 5, wherein upon determining a significant change in image data in the idle area in an image frame relative image data in said idle area in a preceding image frame during the applying the second algorithm, aborting applying the second algorithm and maintaining the idle area as a foreground area in the background model.

7. The method according to claim 1, wherein the second algorithm is applied at a later time when more computational resources are available.

8. The method according to claim 1, wherein the applying the second algorithm comprises applying an image segmentation algorithm for locating an object in the image data, said object at least partly extending into the idle area, wherein image data corresponding to the located object defines the image data that the second algorithm is applied to.

9. The method according to claim 1, wherein the second algorithm is adapted to perform at least one of the following: face recognition, head detection, body detection, vehicle detection, license plate detection, motion analysis, object tracking, and detection of other pre-registered important objects.

10. The method according to claim 1, further comprising masking spatial areas that are part of the foreground.

11. The method according to claim 1, further comprising tracking an object depicted in the video sequence by tracking corresponding image data in spatial areas that are part of the foreground in the video sequence.

12. A non-transitory computer-readable recording medium having recorded thereon a program for implementing the method according to claim 1 when executed on a device having processing capabilities.

13. A video camera capturing image frames in a video sequence, the video camera comprising a control unit having circuitry configured to:
define a background model of the video sequence by applying a first algorithm to a plurality of the image frames, the background model defining, for each spatial area of a plurality of spatial areas in the image frames, whether that spatial area belongs to a background or a foreground in the video sequence, wherein the first algorithm includes a plurality of timers, each timer associated with a spatial area of the plurality of spatial areas;
indicate that an idle area of the defined foreground areas is to be transitioned from the foreground to the background; and
determine whether the idle area is to be transitioned or not by applying a second algorithm to image data of an image frame of the video sequence, the image data at least partly corresponding to the idle area, wherein a spatial area is defined as an idle area in the background model on condition that no significant change has occurred in image data of a spatial area of an image frame relative to image data of the spatial area of a preceding image frame before a predetermined time limit;
wherein upon determining that the idle area is not to be transitioned, maintain the idle area as a foreground area in the background model.

14. The video camera according to claim 13, wherein the circuitry in the control unit is further configured to apply the first and second algorithm to a plurality of the image frames in the video sequence in real time.

15. The video camera according to claim 13, wherein the circuitry is further configured to indicate that an idle area is to be transitioned from foreground to background is performed when a timer of the first algorithm associated with the idle area reaches an indication threshold being lower than the predetermined time limit.

16. The video camera according to claim 15, wherein upon the circuitry determining a significant change in image data in the idle area in an image frame relative image data in said idle area in a preceding image frame during the applying the second algorithm, aborting applying the second algorithm and maintaining the idle area as a foreground area in the background model.

17. The video camera according to claim 13, wherein the applying the second algorithm comprises applying an image segmentation algorithm for locating an object in the image data, said object at least partly extending into the idle area, wherein image data corresponding to the located object defines the image data that the second algorithm is applied to.

* * * * *